United States Patent [19]
Marchioro

[11] Patent Number: 4,502,312
[45] Date of Patent: Mar. 5, 1985

[54] APPARATUS FOR CONTROLLING THE PRESSING FORCE BETWEEN A CONTROLLED DEFLECTION ROLL AND A COUNTER ELEMENT

[75] Inventor: Ignazio Marchioro, Schio, Italy

[73] Assignee: Escher Wyss Aktiengesellschaft, Zurich, Switzerland

[21] Appl. No.: 334,642

[22] Filed: Dec. 28, 1981

[30] Foreign Application Priority Data
Jan. 15, 1981 [DE] Fed. Rep. of Germany ....... 3101114

[51] Int. Cl.$^3$ .................. B21B 37/08; B30B 15/14
[52] U.S. Cl. .................. 72/243; 29/113 AD; 29/116 AD; 72/8; 72/245; 100/162 B
[58] Field of Search .............. 72/241, 243, 245, 8; 29/113 AD, 116 AD; 100/162 B

[56] References Cited
U.S. PATENT DOCUMENTS

| | | | |
|---|---|---|---|
| 3,803,886 | 4/1974 | Sterrett et al. | 72/245 |
| 4,023,480 | 5/1977 | Biondetti | 72/243 |
| 4,286,448 | 9/1981 | Houghton | 72/243 |
| 4,319,522 | 3/1982 | Marchioro et al. | 72/245 X |

Primary Examiner—Francis S. Husar
Assistant Examiner—Steven B. Katz
Attorney, Agent, or Firm—Werner W. Kleeman

[57] ABSTRACT

An arrangement for controlling the pressing or line force of a controlled deflection roll comprises a common adjustment or setting element for separate controllable supporting force sources or force-applying sources. Between the adjustment element and the force-applying sources there are connected converters for generating control signals in accordance with a conversion function which, depending upon the nature and/or site of the force-applying sources, has different characteristics. The converter enables interposing correction signals.

5 Claims, 8 Drawing Figures

Fig.5
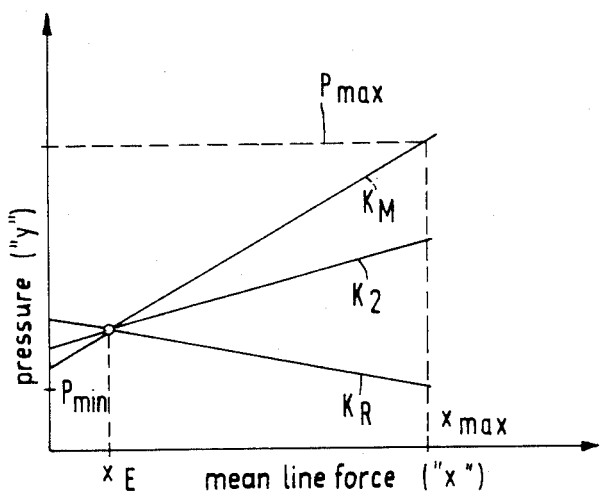
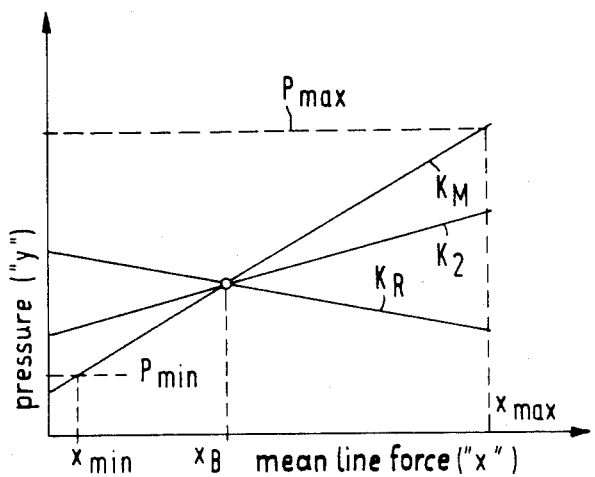
Fig.6

APPARATUS FOR CONTROLLING THE PRESSING FORCE BETWEEN A CONTROLLED DEFLECTION ROLL AND A COUNTER ELEMENT

BACKGROUND OF THE INVENTION

The present invention relates to a new and improved construction of an arrangement or apparatus for controlling the pressing force at the contact zone between a roll and one or a number of counter elements, the roll being constituted by a controlled deflection roll, the bending-through or sag of which can be adjusted by means of force-applying sources which are distributively arranged in the direction of the lengthwise axis of the controlled deflection roll and bear against a common roll support or beam.

Such type of rolling apparatuses have, for instance, multifarious fields of application in the fabrication of paper, in metal rolling mills and so forth. Sometimes there are provided, apart from the aforementioned force-applying sources, also counter force-applying sources which impart to the roll shell of the controlled deflection roll, in conjunction with the force-applying sources, a bending line which is more favourable for the intended fields of application. The principle of one such type of rolling apparatus has been described and illustrated in German Patent Publication No. 2,325,721, published Apr. 29, 1976 in different constructional embodiments. In such patent there is also disclosed that the force-applying sources, if desired combined into groups, can be individually controlled. One such group can be constituted by a single force-applying source, or however more than ten force-applying sources.

As the force-applying source there can be used not only the hydrostatic support bearings or support elements as disclosed in the aforementioned German Patent Publication No. 2,325,721, but also, for instance, electromagnetic arrangements.

A roll arrangement containing such electromagnetic force-applying sources has been disclosed in German Patent Publication No. 2,658,854, and the cognate U.S. Pat. No. 4,062,097, granted Dec. 13, 1977. This prior art arrangement encompasses a common adjustment element, by means of which it is possible to determine once and for all the magnetization current for all force-applying sources. Arranged after such adjustment element are the so-called "regulators", by means of which there can be individually readjusted or regulated the magnetization current of the individual force-applying sources. However, the construction of the last-mentioned components has not been disclosed.

Within the ambit of the present invention it is intended to also designate such components as "controllable force-applying sources" which load relieve at discrete locations a roll shell sector throughout its entire length or portions thereof and which roll shell sector is under load or force, in other words actual "force sinks" or also devices of the type disclosed in German Patent Publication No. 2,332,861 and the cognate U.S. Pat. No. 3,879,827, granted Apr. 29, 1975.

The control of the individual force-applying sources or groups of force-applying sources (herein sometimes referred to as "groups") is problematic. More specifically, the following conditions should be taken into account:

First of all, the force-applying sources must compensate the inherent weight of the roll shell. The influence of this magnitude or parameter can vary as a function of the spacing of the group from the ends of the roll shell, dependent upon the manner in which the roll shell is additionally mounted, at its ends or also near to the roll center.

Furthermore, the force-applying sources also must take-up the inherent weight of the counter element, for instance the roll or band, which is possibly arranged above the controlled deflection roll. Frequently, they often must, in fact, take-up the inherent weight of still further rolls of a calender arrangement, and depending upon the spacing from the roll ends different gravitational effects may be present, and also there must be taken into account possible arching or doming of the counter element.

What however should actually be controlled is the pressing force, for instance the "mean pressing force" as the actual magnitude or parameter which is decisive for the field of application. Additionally, there should be further taken into account that, for instance, during the pressing operation there is not only to be undertaken a uniform web processing, for instance thickness reduction of the material over the web width, in other words there should be accomplished at the same time throughout the length of the roll not only a uniform web processing, but quite frequently there must be imparted uniformity to possibly present irregularities in the web material which are caused by the processing of the web material at upstream located equipment or machinery. This means that the machine operator should be capable of individually controlling the force-applying sources or groups. Under the expression "mean pressing force" or "mean line force" there is to be understood the value of this force which is meaned or averaged over the length of the pressing gap or nip.

It is known to simulate the mechanical construction of a roll system by means of a model and to tap-off thereat control signals, by means of which it is possible to act upon the force-applying sources of the roll system itself. In this respect attention is directed to German Patent Publication No. 2,825,706 and the cognate U.S. Pat. No. 4,222,324, granted Sept. 16, 1980. This control arrangement is relatively complicated, and there is needed a separate model for each individual field of application.

SUMMARY OF THE INVENTION

Therefore, with the foregoing in mind it is a primary object of the present invention to provide a new and improved construction of arrangement for controlling the pressing force between a controlled deflection roll and a counter element in a manner not afflicted with the aforementioned drawbacks and limitations of the prior art constructions.

Another and more specific object of the present invention is directed to a new and improved construction of apparatus of the character described for controlling a roll system, wherein by means of a single adjustment there can be altered the mean or average pressing force and there can be produced control signals which are accommodated to each group, and wherein the above-discussed conditions are satisfactorily fulfilled.

Yet a further significant object of the present invention and in keeping with the above-stated objects is to provide an arrangement of the character described which is simple in its construction and can be readily accommodated to different operating conditions without any great expenditure.

A further object of the invention is directed to an apparatus for controlling the pressing force between a controlled deflection roll and a counter element, wherein the adjusted pressing force also can be used as a set value source for a possibly provided regulation loop, in the event that there is provided during operation an individual regulation of the individual groups, as such has been disclosed for instance in German Patent Publication No. 2,555,677 and the cognate U.S. Pat. No. 4,074,624, granted Feb. 21, 1978.

Now in order to implement these and still further objects of the invention, which will become more readily apparent as the description proceeds the arrangement for controlling the pressing force between a counter element and a controlled deflection roll as contemplated by the invention is manifested by the features that the regulating elements or regulators are structured as control converters, by means of which there can be transformed or converted a common control signal x generated by the common adjustment element, in accordance with the relationship $y_i = a_i x + b_i$ into force-proportional group control signals y ($Y_1$, $Y_2$ ... $Y_n$). In each regulation element the values $a_i$, $b_i$ are essentially constant over the entire range of the pressing forces and are dimensioned in such a manner that in the presence of two predetermined values of the mean pressing force typically, for instance, lower and upper threshold values of the mean pressing force, there prevail at a rolled product minimum deviations of the product profile or sectional shape over the roll shell length.

It has been surprisingly found that the simple linear relationship between the common control signal and the individual group control signals is adequate in order to predetermine the pressing force over the entire roll length. It should be understood that the constants $a_i$ and $b_i$ are different for the individual groups, however during other fields of application can be easily accommodated.

Both the predetermined values of the mean pressing force—in accordance with two predetermined values of the common control signal x—are generally selected such that the working range of the relevant roll arrangement lies between both of these values, which then constitute the lower threshold and the upper threshold for the mean pressing force which is to be applied. This is however not absolutely required; it is possible to select also other values which are particularly significant for the momentarily encountered field of application. It will be seen that the simple linear relationship is sufficient to ensure at least approximately, even in the presence of mean pressing forces deviating from both of these values, for extremely slight profile deviations of the rolled product.

For the case $x = 0$ corresponding to a mean line force null there results $y_i = b_i$. This is the case when the force-applying sources only must take-up the inherent weight of the roll shell of the controlled deflection roll. From this relationship there can be determined the constants $b_i$.

The determination of the constants $a_i$ is dependent upon the construction of the roll system. As an example there is mentioned the simplified case of a roll combination containing cylindrical counter roll and a controlled deflection roll, the shell bearings of which are vertically moveably guided in guides, and the counter roll is arranged vertically over the adjustable roll. With the mean pressing force, at which the force-applying sources take-up the inherent weight of the roll shell in addition to the inherent weight of the counter roll (without having to take into account any possibly provided counter force-applying sources), in other words the rolls experience almost no sag or bending-through, there are then present over the entire axial extent of the roll system the same conditions. As a result all of the force-applying sources receive the same group control signal, something which can be determined mathematically or empirically. The characteristics of the function $y = ax + b$ then all intersect in the thus defined point. From both points there is determined the function for all group control signals. Through the use of similar considerations it is possible to determine the constants $a_i$ also for the case of other roll systems.

It is to be remarked that the constants $a_i$ are sign-related, in other words it is quite possible for them to assume negative values. This will be described more fully hereinafter.

The person versed in the art will recognize that the construction of the arrangement with electrical components can be realized particularly simply, since the linear functions can be obtained simply by resistance networks. The use of adjustable resistances or resistors affords the possibility of accommodation to the most different roll systems. Also other control elements can be conceivably used, such as pneumatic, mechanical or hydraulic control elements. Additionally, the machine operator can impose "spurious magnitudes" upon the individual converters, so that by shifting the operating point along the control characteristic it is possible to control the force-applying sources or groups in accordance with the rolling result; or by changing only the magnitude $b_1$ it is possible to act upon the pressing force at the related force-applying source or group, whereby of course there also is incorporated a deformation of the roll shell.

It is to be observed that at least hydraulic force-applying sources are only capable of exerting pressure forces (meaning positive forces) not however any traction forces (meaning negative forces) upon the roll shell. Depending upon the construction of the roll system, or also under certain other prerequisites, for instance in the case of a domed or arched counter element, or when the width of the material web which is to be rolled is appreciably smaller than the axial extent of the roll shell supported by the force-applying sources, in any event at least one of the force-applying sources for the generation of certain mean line forces must operate near to the value null of the supporting force. The control at the neighbourhood of this operating or working point, particularly if the machine operator wishes to undertake corrections, usually is quite difficult in general and particularly difficult specifically if there is used in known manner, for instance, hydrostatic valve-controlled force-applying sources.

In such situations it has been found to be especially advantageous if, as already known from the state-of-the-art, there are provided counter force sources which are controlled in the same manner as the force-applying sources themselves. A further reason for the use of counter force sources may arise if the roll shell of the controlled deflection roll is driven to rotate at higher rotational speeds and/or works with lower pressing force, in order to ensure for a positionally stable operation and one which is free of vibrations.

The resultant supporting force upon the roll shell then arises from the superimposing of the effect of the force-applying sources and the counter force sources or counter force-applying sources, so that it is possible to randomly fall below a "minimum magnitude" $b_{i1}$ for the force-applying sources if a counter force-applying source is effective in opposite direction with the constant $b_{i2}$.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 5 and 6 respectively illustrate still further diagrams.

DETAILED DESCRIPTION OF THE PREFERRED EMBODIMENTS

Figure 1A:
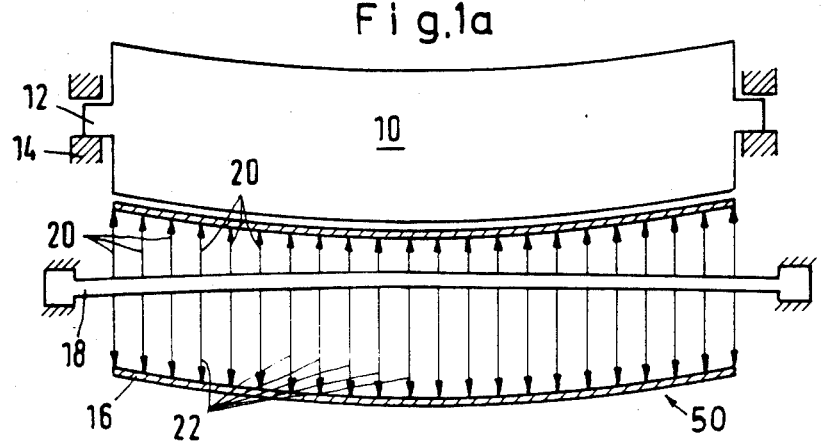
FIG. 1a illustrates schematically a rolling apparatus composed of a controlled deflection roll and counter roll with a first predetermined mean line force.
Figure 1B:
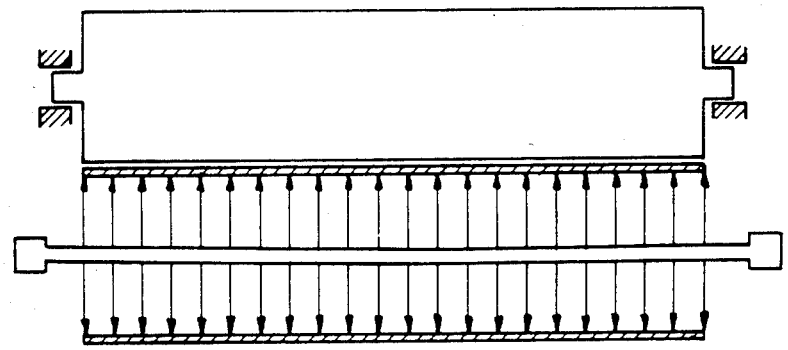
FIG. 1b illustrates the same rolling apparatus as in FIG. 1 during a second load condition.
Figure 1C:
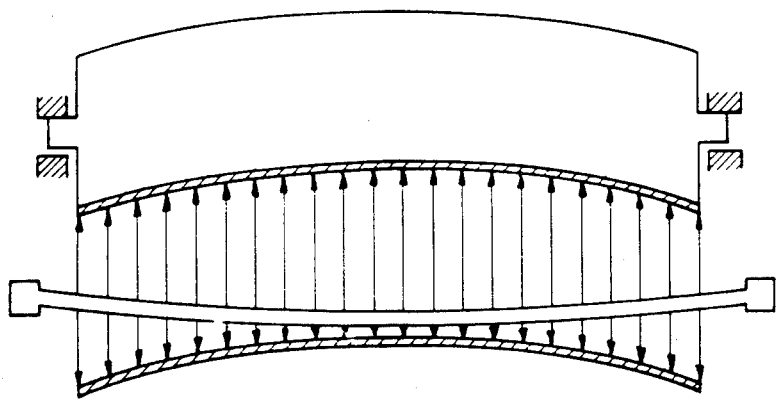
FIG. 1c illustrates the same rolling apparatus as in FIG. 1 during a third load condition.

Describing now the drawings, in FIGS. 1a, 1b and 1c there have been schematically illustrated a cylindrical counter pressure roll 10 which is mounted at its ends at its bearing journals 12 in bearing blocks 14. Additionally, there is provided a controlled deflection roll 50 coacting with a counter support or element here shown as the counter pressure roll 10, this controlled deflection roll 50 containing a roll shell 16 which is vertically disposed below the counter roll or counter pressure roll 10 and is supported at a roll support or beam 18 which is stationarily fixed at its opposed ends in a manner well known in this art. Additionally, there will be recognized the force-applying sources or elements 20 and the counter force-applying sources or elements 22, which have been symbolized by the directional arrows shown in FIG. 1a and designated by the corresponding reference characters 20 and 22, respectively. The deformation of the components during the different load conditions have been appreciably exaggerated in the illustration of the drawings, in order to render clearer the prevailing conditions; the resultant length of the "force-applying source arrows", shown in the drawings, do not however correspond to the magnitude of the force which is to be applied by the relevant force-applying source, which, in turn, should be proportional to the related group control signal, because the forces required for the elastic deformation of the roll shell 16 do not come into play in the illustrated arrangement.

FIG. 1a illustrates the case of the mean or average line force null. Here the weight of the counter roll 10 is solely taken up by its bearings. The force-applying sources 20 and counter force-applying sources 22 are intended to support the weight of the roll shell 16 and additionally to elastically deform such in accommodation to the sag or bending-through of the counter roll 10. The roll support 18 therefore is correspondingly upwardly bent-through or deflected.

FIG. 1b illustrates the case where the predetermined mean or average line force is dimensioned to be just of a magnitude that the inherent weight of the counter roll 10 and the roll shell 16 is compensated by the force-applying sources 20 and the counter force-applying sources 22. The counter roll 10 so-to-speak "floats" in its bearings; the roll shell 16 is not elastically deformed. The roll support or beam 18 now is somewhat bent-through or deflected in the opposite direction from that shown in FIG. 1a.

Finally, FIG. 1c illustrates the case of maximum mean or average line force. The roll support 18 is accordingly markedly bent-through; the force-applying sources in the intermediate group of force-applying sources must receive a maximum control signal.

As explained above, the illustrated length of the "force-applying source arrows" are not proportional to the forces which must be applied, and therefore, also are not proportional to the control signals which are to be used; this is true in any case for the situation portrayed in FIGS. 1a and 1c and generally is true for all cases deviating from the case portrayed in FIG. 1b. It can be namely insinuated that the inherent weight per unit length of the roll shell 16 is appreciably less than that of the counter roll 10 and also differs from the moment of resistance. As a consequence thereof, the centre of the roll shell 16, with the case illustrated in FIG. 1a, must be downwardly elastically deformed, whereas in the case illustrated in FIG. 1c the same holds true for the ends of the roll shell 16. Consequently, it is to be assumed for the force-applying sources 20 in the groups near to the roll end that increasing mean pressing forces are to be correlated to decreasing control signals, which means that the control characteristic has a descending path, possibly extending into the region of negative values. On the other hand, for the intermediate group of force-applying sources there prevails an ascending control characteristic.

Furthermore, it will be recognized that basically counter force-applying sources need be provided only either at the centre or, however, at the ends of the roll shell 16. This however is only true for the here illustrated simple example of a rolling device, and the number and arrangement of the force-applying sources and the counter force-applying sources is to be accommodated to the momentarily encountered construction.

It is to be remarked that with other rolling or roll systems or configurations there can prevail completely different correlations. The invention is not only then useful if the controlled deflection roll coacts with a cylindrical counter roll; the counter roll can be arched or domed, or instead of using a counter roll there can be provided a band, a wire or sieve band or even a surface which is to be rolled, for instance a floor or road covering which is to be compacted.

Figure 2:
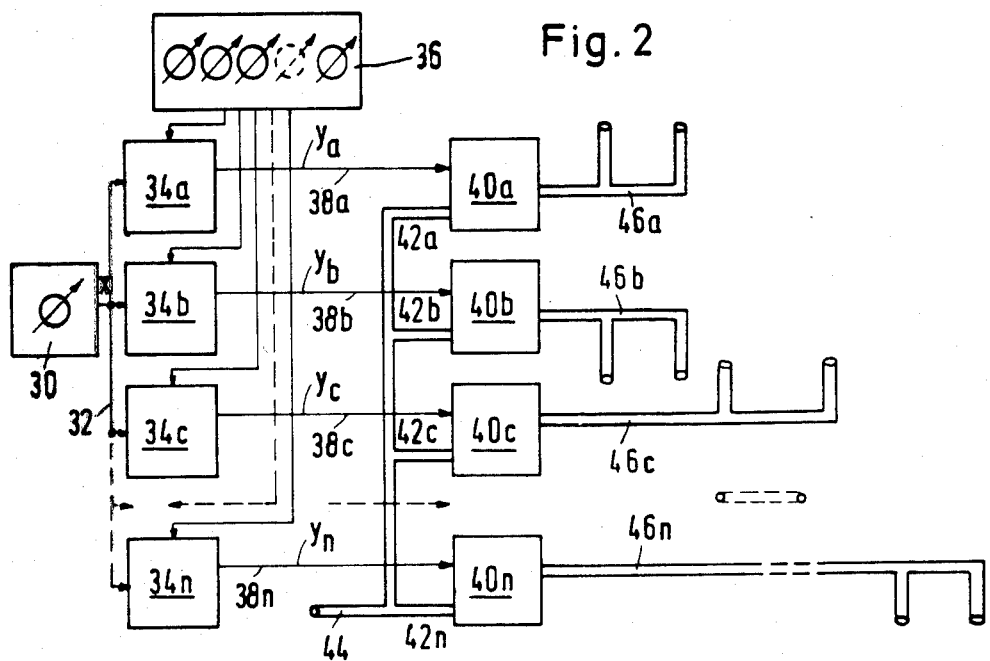
FIG. 2 schematically illustrates a control arrangement according to the invention for the rolling apparatus of FIGS. 1a, 1b and 1c.

FIG. 2 schematically illustrates a block circuit diagram of a control arrangement for a rolling apparatus of the type shown in FIGS. 1a, 1b and 1c. It is assumed for instance, that the force-applying sources, as is known from the state-of-the-art, are hydrostatic support elements or bearings which develop a supporting force which is proportional to the pressure of the pressurized fluid medium.

An adjustment element 30 enables inputting a mean pressing force, for instance in the form of a voltage or a current proportional to the desired force, and which has been designated by reference character x in FIG. 2 and appears at the line 32. This inputted magnitude x can be applied to the converters 34a, 34b . . . 34n which convert or transform the common control signal x according to the relationship $y=ax+b$ into the group control signals $y_a, y_b \ldots y_n$. For this purpose the converters 34a, 34b . . . 34n contain appropriately designed resistance networks. It is to be remarked that the here separately illustrated converters can of course be grouped together into a matrix circuit.

There is available for the machine operator a further adjustment device 36 having the same number of adjustment elements as there are present separate controllable groups of force-applying sources or counter force-applying sources. The output signals of such adjustment device or adjustment means 36 are separately inputted to the individual converters 34, in order to zonewise alter the pressing force in accordance with the deviations from the common predetermined mean pressing force.

The thus formed output signals y of the converters 34a, 34b . . . 34n appear at the lines 38a, 38b . . . 38n and serve as group control signals for adjustment elements 40a, 40b . . . 40n. In the illustrated embodiment there are provided hydrostatic support elements or bearings as the force-applying sources, wherein the generated supporting force is proportional to the pressure of the hydraulic fluid medium impinging thereat. The adjustment elements 40a, 40b . . . 40n are accordingly pressure control valves, at the inputs 42a, 42b . . . 42n of which there appears the maximum pressure of a supply line 44 and which impinge the output lines 46a, 46b . . . 46n with a correspondingly reduced pressure in accordance with the thereto inputted electrical signals. These output lines then lead to the individual force-applying sources of the grouped together group; in the illustrated embodiment they are connected to the output line 46a two neighbouring force-applying sources, to the output line 46b both correlated counter force-applying sources and so forth. The force-applying sources have not been shown in the drawing to simplify the illustration, but their construction is known as is also the construction of the pressure control valves, for instance from U.S. Pat. No. 3,802,044, granted Apr. 9, 1974.

Figure 3:
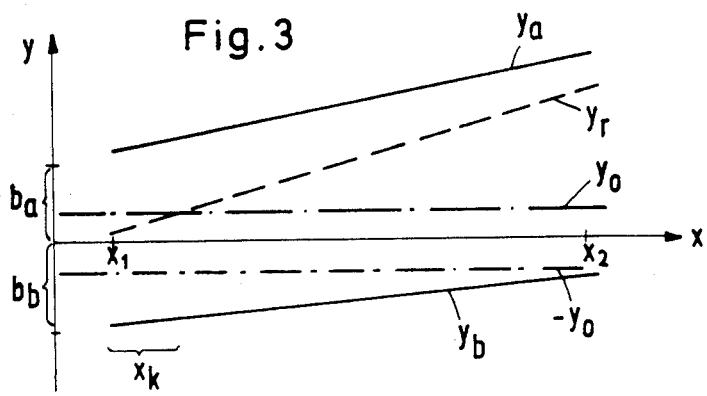
FIG. 3 is a first graph of a control characteristic for a force-applying source system composed of force-applying sources or force-applying source groups and counter force-applying sources or counter force-applying source groups.

FIG. 3 illustrates the course of the control characteristics of both converters 34a and 34b. Since the group control signals $y_b$ reduce the mean line force—here one is concerned with the control signals for a counter force-applying source group—they have been plotted negatively. The resultant characteristic $y_r$ then corresponds to the course of the pressing force effective at the roll nip at the region of such force-applying source group. There will be recognized that the magnitude $y_r$ extends within a range $x_k$ between two abscissa-parallel lines $y_o$—$y_o$, however both characteristics $y_a$ and $y_b$ within the working range of $x_1$ to $x_2$ remain externally of such range. This is desired, for the reasons already explained above, because the range or region between the lines $y_o$, $-y_o$ corresponds to that region where the pressure control valves are difficult to control and at the same time there should be available a certain freedom for correction by the machine operator.

Figure 4:
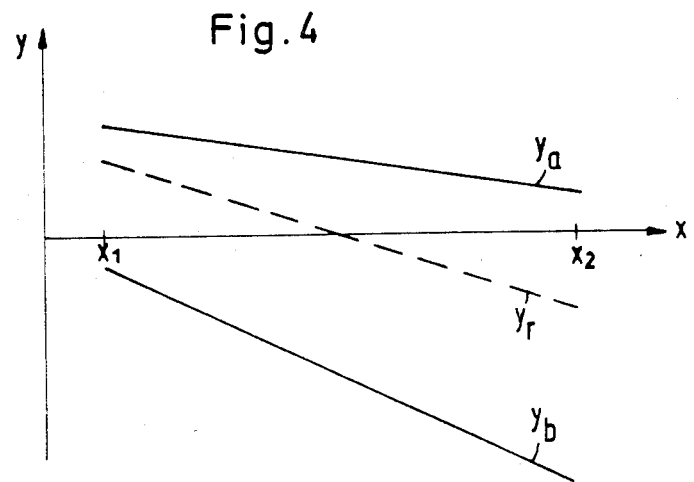
FIG. 4 illustrates a second diagram of a different system.

FIG. 4 illustrates a further diagram for two control converters, the output signals of which are transmitted to a force-applying source or to a counter force-applying source correlated thereto. It will be recognized that the resultant control characteristic $y_r$ here can extend through the region about the pressing force null up to negative values, although neither the force-applying source (characteristic $y_a$) nor the counter force-applying source ($y_b$) need to be controlled into the region of the low absolute values.

Based upon FIGS. 5 and 6 there is intended to explain how the change in the shape of the counter element can effect the design of the control converter. By way of example there will again be assumed the situation portrayed in FIGS. 1a, 1b and 1c. As explained above, the characteristics all intersect at a common point and there have here only been illustrated three of such characteristics; $K_R$ for an end or marginal group, $K_Z$ for an intermediate group between the end and centre of the roll, and $K_M$ for a central group of force-applying sources.

Instead of the control magnitude "x" there is here indicated the "mean line force", since in reality the control magnitude should of course determine the mean line force, and instead of the control output signal "y" there is here indicated "pressure", since one is concerned with an arrangement containing hydrostatic force-applying sources where, in reality, the generated force is proportional to the momentarily applied pressure.

FIG. 5 therefore corresponds to the arrangement of FIGS. 1a, 1b and 1c, and as will be observed, the intersection point is present at relatively low pressure values. In the direction of higher line forces the characteristics or characteristic lines therefore extend further apart. The possible maximum pressure is however limited by the system, and both strength and also cost considerations play a role. In particular, for the central group the attainable mean line force is limited to the working point "$p_{max}$" of the characteristic $K_M$.

Now if the cylindrical counter roll is replaced by a positive, meaning a convex domed counter roll, then the intersection point, shown in FIG. 6, appears at higher values for pressure and mean line force, quite specifically exactly at that location where for the "arched line force" the arching or doming of the counter roll is just compensated by the effect of the force-applying sources and again there is present a linear work nip or gap. The converse holds true for concave arched counter rolls. As will be apparent by simply considering the foregoing, the slope of the characteristics, assuming however the same conditions, are left unchanged. The desired result is that the maximum permissible pressure $P_{max}$ first can be obtained at an appreciably higher mean line force at the roll nip. The machine operator only then has to fulfil the task of newly setting the constants $b_i$, and the determination of the magnitudes can be accomplished mathematically or experimentally.

The upper threshold $x_{max}$ for the obtainable line force in the case of the arched counter roll is greater than for the case of the cylindrical counter roll. On the other hand, there is present also a lower pressure threshold $P_{min}$, which is not fallen below in the case of the latter, but however is fallen below in the case of the arched or domed counter roll as shown in FIG. 6. Accordingly, there is also defined a lower boundary of the control range for the line force at $x_{min}$. This boundary $P_{min}$ has already been discussed with respect to FIG. 4. The inherent weightline force $x_E$ and the doming line force $x_B$ have likewise been plotted in FIGS. 5 and 6, respectively.

While there are shown and described present preferred embodiments of the invention, it is to be distinctly understood that the the invention is not limited thereto, but may be otherwise variously embodied and practiced within the scope of the following claims. Accordingly,

What I claim is:

1. In an arrangement for controlling the pressing force between a counter element and a controlled deflection roll having a roll shell and a roll support for supporting said roll shell, wherein force-applying sources distributively arranged in axial direction and supported at the roll support serve to press the roll shell against the counter element over its entire length or at one or a number of regions thereof, and wherein groups of force-applying sources can be separately controlled and there is provided a common adjustment element for the pressing force following which there is arranged for each group of force-applying sources an individually adjustable regulation element, the improvement which comprises:

said regulation element being structured as control converters;

the common adjustment element serving for generating a control signal x;

said control converters converting the common control signal x generated by the common adjustment element in accordance with the relationship $y_i = a_i x + b_i$ into force-proportional group control signals y ($Y$, $Y_2$ ... $Y_n$); and in each regulation element the values $a_i$, $b_i$ are essentially constant over the entire range of the pressing forces and are dimensioned in such a manner that in the presence of two predetermined values of the mean pressing force there prevail at a rolled product minimum deviations of the product profile over the roll shell length.

2. The arrangement as defined in claim 1, wherein:
said control converters are structured for individual adjustment of the values a and b.

3. The arrangement as defined in claim 1, further including:

counter force-applying sources provided in addition to said force-applying sources for controlling the pressing force at the controlled deflection roll;

said counter force-applying sources being effective in the direction of the counter element and also being supported at the roll support;

said counter force-applying sources acting essentially in a direction opposite to the direction in which the force-applying sources act, in order to obtain a bending line of the roll shell of the controlled deflection roll which is more favourable for the intended fields of use; and group control signals of the counter force-applying sources being derivable from the common control signal x by means of similar control converters.

4. The arrangement as defined in claim 1, wherein:
said counter element comprises a cylindrical counter roll; and the straight lines defined by the equation $Y_i = a_i x + b_i$ all intersect at least approximately at a common point which essentially corresponds to the inherent weight-line force of the counter roll.

5. The arrangement as defined in claim 1, wherein:
said counter element comprises a domed counter roll; and that the straight lines defined by the equation $y_i = a_i x + b_i$ all intersect at least approximately at a common point which corresponds to the doming line force of the counter roll.

* * * * *